US008933582B2

(12) United States Patent
Zheng et al.

(10) Patent No.: US 8,933,582 B2
(45) Date of Patent: Jan. 13, 2015

(54) DUAL OUTPUT POWER SUPPLY

(75) Inventors: Junjie Zheng, Santa Clara, CA (US); Jangsoo Han, Seoul (KR)

(73) Assignee: Dialog Semiconductor Inc., Campbell, CA (US)

( * ) Notice: Subject to any disclaimer, the term of this patent is extended or adjusted under 35 U.S.C. 154(b) by 680 days.

(21) Appl. No.: 13/181,330

(22) Filed: Jul. 12, 2011

(65) Prior Publication Data

US 2012/0025606 A1    Feb. 2, 2012

Related U.S. Application Data

(60) Provisional application No. 61/368,806, filed on Jul. 29, 2010.

(51) Int. Cl.
    *H02J 1/00*     (2006.01)
    *H02J 3/00*     (2006.01)
    *H02M 3/28*     (2006.01)
    *H02M 3/335*    (2006.01)

(52) U.S. Cl.
    CPC .......... *H02M 3/285* (2013.01); *H02M 3/33523* (2013.01)
    USPC .......................................................... 307/11

(58) Field of Classification Search
    USPC ................................... 307/11, 17, 20, 39, 42
    See application file for complete search history.

(56) References Cited

U.S. PATENT DOCUMENTS

| | | | |
|---|---|---|---|
| 5,530,636 A | 6/1996 | Brown | |
| 6,483,726 B2 | 11/2002 | Chen et al. | |
| 6,812,776 B2 | 11/2004 | Henry | |
| 6,954,058 B2 | 10/2005 | Ota et al. | |
| 7,642,763 B2 | 1/2010 | Lu et al. | |
| 7,675,281 B1 | 3/2010 | Holt et al. | |
| 8,537,572 B2 * | 9/2013 | Fornage et al. | ............ 363/21.12 |
| 2002/0131788 A1 | 9/2002 | Nakaya | |
| 2004/0183507 A1 | 9/2004 | Amei | |
| 2006/0284568 A1 * | 12/2006 | Chang et al. | .................. 315/282 |
| 2008/0112193 A1 | 5/2008 | Yan et al. | |
| 2009/0261653 A1 | 10/2009 | Furukawa et al. | |

FOREIGN PATENT DOCUMENTS

KR    10-0685104 B1    2/2007

OTHER PUBLICATIONS

PCT International Search Report and Written Opinion, PCT Application No. PCT/US2011/043751, Nov. 9, 2011, six pages.
Korean Intellectual Property Office, Office Action, Korean Patent Application No. 10-2013-7004255, Feb. 4, 2014, nine pages.

* cited by examiner

*Primary Examiner* — Carlos Amaya
(74) *Attorney, Agent, or Firm* — Fenwick & West LLP

(57) ABSTRACT

A single power supply provides at least one constant voltage output and at least one constant current output. The single power supply includes two or more switching power converters, such as flyback converters, that are independently controllable based on an error signal corresponding to the associated output. Further, one or more of the switching power converters can implement such control using primary-side feedback. The switching power converters can be flyback converters. Any switching power converters included the in the single power supply can both be part of a single PCB assembly, part of a single IC package, or part of a single monolith semiconductor die.

9 Claims, 9 Drawing Sheets

|  |  | A<br>One transformer design | B<br>iWatt Slim two transformer design |
|---|---|---|---|
| Size | Thickness | Limited by transfomer | very Thin <10mm |
| Performance | Efficiency | Low | Higher |
|  | MOSFET | Need a big MOSFET to hand<br>Need low Rds due to thermal<br>D2-PACK package | Low peak current go through each<br>2 PCS I2PAK package or TO251 |
|  | Voltage Regulation | Poor across regulation<br>Need big dummy load and get | Best regulation<br>Simple control for each converter<br>Non need more dummy load |
|  | LED current Regulation | Need to have DCDC regulator | Tight LED current regualtion, without addtional DCDC LED current regulator |
|  | Transformer | Need a big but low profile<br>Complex winding<br>Difficult for production line | General ferrite core type, low cost<br>Easy for production line<br>EPC17 may make low profile |
|  | Protection |  | Independent protection on each |
|  | Adjustable voltage | Adjust any output will affect<br>Not so easy to get ±1V | Best performance ,<br>Adjust each one separately |
| Cost ($) |  | High | Low |

FIG. 3

DUAL OUTPUT POWER SUPPLY

RELATED APPLICATION

This application claims priority from U.S. provisional application No. 61/368,806 filed on Jul. 29, 2010 which is incorporated by reference herein in its entirety.

BACKGROUND

1. Field of Art

This invention pertains generally to the field of power conversion and, more particularly, to switching power supplies with feedback control.

2. Description of the Related Art

The power requirements for various types of load devices used in an electronic device or system can vary widely. For example, most device loads require a tightly controlled constant voltage source across the load operating range. However, there are also load devices, such as light emitting diode (LED) elements, that are controlled employing a constant current source. An electronic device or system containing these load devices requires the use of multiple power converters further complicating system design and cost.

SUMMARY

In accordance with a first aspect of the invention, a four-terminal power supply package is provided for controlling two power converters for delivery of power from a source to a plurality of loads. In one embodiment, the four-terminal package has a first terminal for coupling to a primary winding of a transformer of the first power converter, a second terminal for coupling to a primary winding of a transformer of the second power converter, a third terminal for coupling to a ground reference, and a fourth terminal for coupling to a source of operating power. A first internal power switch has an input coupled to the first terminal and output coupled to the third terminal. A second internal power switch has an input coupled to the second terminal and output coupled to the third terminal. An internal controller coupled to the activation gate of both the power switches provides independent control and responsiveness to error signals and parameters of each power converter.

The controller utilizes signals and waveforms present on the primary side of power converters, including but not limited to the primary of the power transforms and the output current of each of the power switches. In one embodiment, the first power converter is optimized to provide a constant voltage output to the associated load(s) while the second power converter is optimized to provide a constant current source to the associated load(s). As mentioned above, while the controller provides independent control of the two power converters, the controller may operate the two power converters either synchronously and/or asynchronously. Depending on design considerations, the internal power switches and controller circuitry may be formed as part of a single integrated circuit or multiple integrated circuit elements.

In accordance with another aspect of the invention, an eight-terminal power supply package is provided for controlling two power converters for delivery of power from a source to a plurality of loads. In one embodiment, the eight-terminal package has a first terminal for coupling to a primary winding of a transformer of the first power converter, a second terminal for coupling to an activation gate of a first external power switch, a third terminal to sense the primary current of the first power converter, a fourth terminal for coupling to a primary winding of a transformer of the second power converter, a fifth terminal for coupling to an activation gate of a second external power switch, a sixth terminal to sense the primary current of the second power converter, a seventh terminal for coupling to a ground reference, and an eighth terminal for coupling to a source of operating power. A controller coupled to the activation gate of both the external power switches provides independent control and responsiveness to error signals and parameters of each power converter.

The controller utilizes signals and waveforms present on the primary side of power converters, including but not limited to the primary of the power transforms and the output current of each of the power switches. In one embodiment, the first power converter is optimized to provide a constant voltage output to the associated load(s) while the second power converter is optimized to provide a constant current source to the associated load(s). As mentioned above, while the controller provides independent control of the two power converters, the controller may operate the two power converters either synchronously and/of asynchronously. Depending on design considerations, the controller circuitry may be formed as part of a single integrated circuit or multiple integrated circuit elements.

In accordance with another aspect of the invention, a terminal for coupling to an output current setting signal is provided. The output current setting is used to adjust the constant current output of the second power converter.

Another aspect of the invention in a single PCB that comprises at least one power converter configured to produce a constant voltage output and at least one other power converter configured to produce a constant current output.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3 is a table that compares designs for two embodiments of a dual output power supply.

DETAILED DESCRIPTION

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Conceptual Overview

For purposes of the following description and claims, the term "package" is to be broadly construed to include, by way of example and not limitation, a single chip or semiconductor die having one or more circuits formed thereon, as well as a plurality of chips and/or semiconductor dies having one or more circuits each formed thereon and mounted on common substrate. The term "terminal" is also to be broadly construed to include any form of electrical junction that serves as either an input or output to a circuit in the package. By way of example only, a package may comprise a substrate having one or more dies mounted thereon and covered with a protective lid, with a number of terminals (e.g., metal leads) extending from the package and coupled to circuit elements located on the one or more dies. As used herein when describing elements of various embodiments, "external power switch" refers to a power switch located outside of a power supply control package, and "internal power switch" refers to a power switch located within a power supply control package. A power switch can be a MOSFET, bipolar junction transistor, or any other electrically-controlled switching mechanism capable of switching appropriate current and voltage signals.

Figure 1:
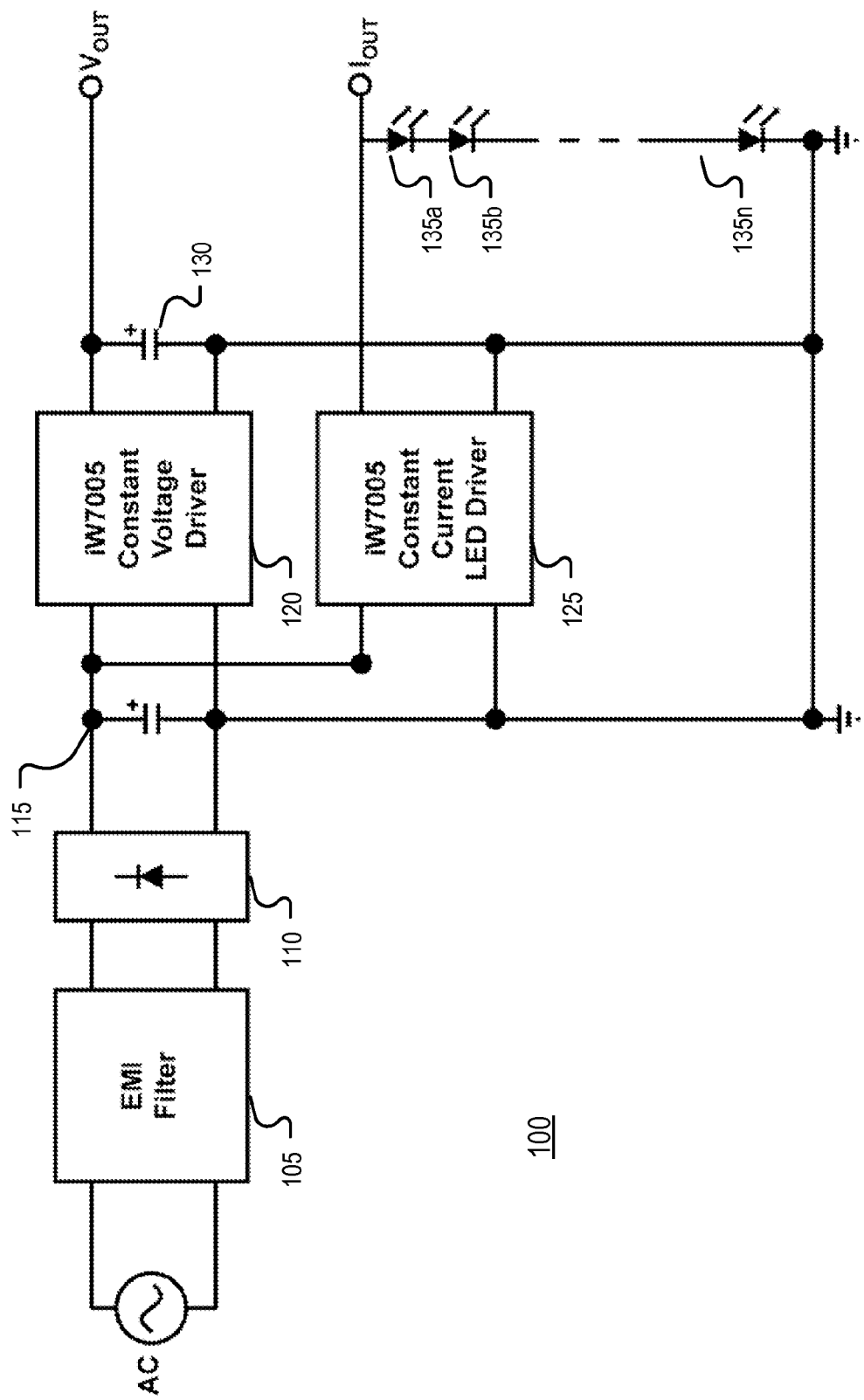
FIG. 1 is a block diagram of one embodiment of a dual output power supply.

FIG. 1 is a block diagram of one embodiment of a power supply 100. The power supply 100 provides a constant voltage (CV) output, labeled as $V_{out}$, and a constant current (CC) output, labeled as $I_{out}$. In one embodiment, the CV output and the CC output can be independently controlled. A single power supply 100 that provides both a CV and a CC output is advantageous for a wide range of applications. For example, many television and computer monitors require (i) a CC supply for the powering of light-emitting diodes (LEDs) used to provide backlighting and (ii) a CV supply for the powering of other monitor components, such as motherboards, graphic processors, and other electronics. As flat-screen monitors have become thinner, it has become necessary to place conventional power supplies outside of the monitor case. However, providing both the CC supply and the CV supply with a single integrated power supply 100 can improve (i.e., shrink) the form factor of the power supply 100 and enable placement of the power supply 100 entirely within the case of a monitor. Other possible applications include street lights that incorporate LED lighting.

In the power supply 100 of FIG. 1, a series combination of an EMI Filter 105 and rectifier 110 receive an AC supply voltage and provide a rectified DC input voltage at node 115. This rectified DC input voltage is an input voltage for two power supply modules, a CV module 120 and a CC module 125. Both power supply modules 120, 125 are also tied to a common ground. As stated above, the CV module 120 provides the CV output labeled as $V_{out}$, whereas the CC module 125 provides the CC output labeled as $I_{out}$. The CC output can be used, for example, to power one or more light-emitting diodes (LEDs) 135 such as those typically used in flat-screen television or computer monitors. Also, in some embodiments, the CV module 120 produces multiple CV outputs from a single voltage or current input. Similarly, different embodiments of the CC module 125 can produce multiple CC outputs from a single voltage or current input. The CV module 120 and CC module 125 can be included within a single printed circuit board (PCB) to form a single integrated dual output power supply 100.

Alternatively, the CV module 120 and the CC module 125 can be integrated into a single integrated circuit (IC) package, either by the inclusion of multiple dies within the IC package or by inclusion of both modules on a single monolithic semiconductor die. Thus, the embodiments herein beneficially include minimal terminal power supply packages for controlling two or more independent power converters, including converters that isolate the input and output through a transformer without requiring feedback from the secondary side of the transformer. Furthermore, each individual power converter can be independently controlled, responding to an associated error signal and control methodology, thereby easing system design and reducing cost.

Board-Level Integration

Figure 2:
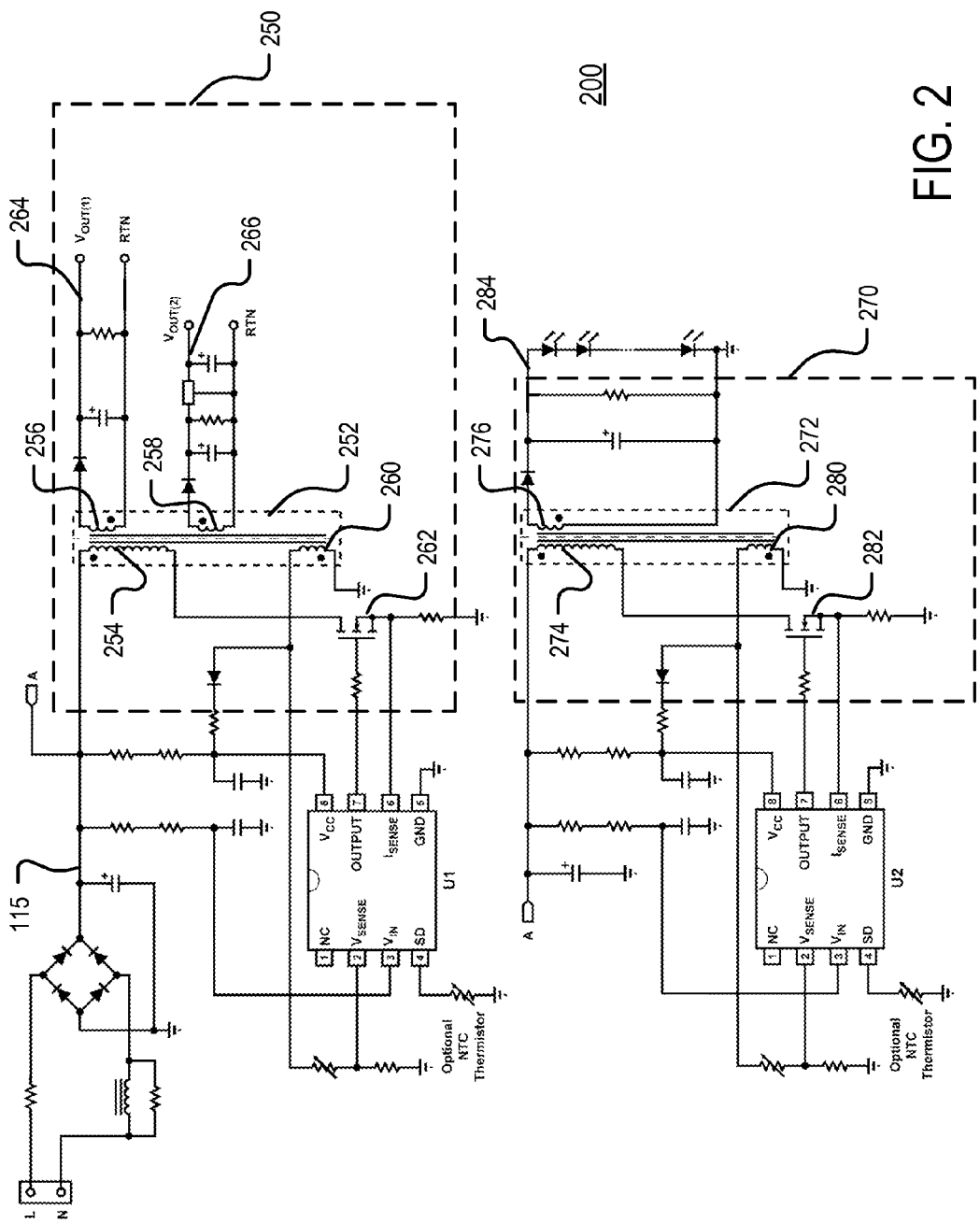
FIG. 2 provides a schematic view of one embodiment of a dual output power supply.

FIG. 2 provides a schematic view of an embodiment of a dual output power supply 200. Dual output power supply 200 comprises two power supply control packages, U1 and U2. U1 is connected to a first network of external components so as to implement a first flyback converter 250 that is configured to produce at least one CV output based on a rectified DC voltage at node 115 (also labeled as node A). U2 is connected to a second network of external components so as to implement a second flyback converter 270 that is configured to produce at least one CC output based on the rectified DC voltage. In one embodiment, the dual output power supply 200 comprises two transformers 252, 272, one for each flyback converter 250, 270.

The first flyback converter 250 comprises a 4-winding isolating transformer 252. Transformer 252 includes a primary winding 254 of which one end is coupled to the rectified DC voltage at node 115 and the other end is coupled to power switch 262. When power switch 262 is closed, current flows through primary winding 254 of transformer 252 and energy therefore increases within the magnetic core of transformer 252. When power switch 262 subsequently opens, current ceases to flow through primary winding 254 and energy stored in the magnetic core of transformer 252 is released as current through two flyback-biased secondary windings 256, 258. Secondary winding 256 is coupled to a blocking diode and a filter/storage capacitor in order to produce a first CV output 264. Secondary winding 258 is coupled to a blocking diode and a filter/storage capacitive network in order to produce a second CV output 266. CV output 264 and CV output 266 are related to the rectified DC voltage at node 115 based on the turns ratio between primary winding 254 and the corresponding secondary winding 256, 258 as well as the timing with which power switch 262 opens and closes.

In one embodiment, U1 is an 8-terminal power supply control package. The OUTPUT terminal of U1 is coupled to power switch 262, and U1 is configured to alternately open and close power switch 262 to implement the above-described energy transfer from primary winding 254 to secondary windings 256, 258. Depending on the embodiment, U1 can operate power switch 262 in accordance with a pulse width modulation (PWM) technique, a pulse frequency modulation technique (PFM), a pulse train technique, or any combination thereof. One example of a pulse train technique for controlling the operation of power switch 262 is provided in commonly assigned U.S. Pat. No. 6,434,021, entitled "Switching Power Supply Packages," which is fully incorporated herein by reference.

When implementing one of the above-described switching techniques to control power switch 262, U1 can utilize one or more feedback signals. For example, U1 includes an ISENSE terminal that is coupled to a resistor placed between power switch 262 and ground. Hence, a voltage proportional to the current through primary winding 254 (which is the same current that passes through power switch 262) appears at the ISENSE terminal. U1 can therefore control power switch 262 based on current through primary winding 254 (i.e., current through power switch 262), sometimes referred to as current-mode control. U1 also includes a VSENSE terminal that is coupled to the midpoint of a voltage divider (e.g., a serial arrangement of two resistors or a resistor and a potentiometer). The voltage divider is coupled in parallel with a fourth winding 260 of transformer 252. Hence, the voltage at VSENSE is proportional to the voltage on any one of the windings 254, 256, 258, 260 of transformer 252 based on the relevant turns ratios and voltage divider ratio. Accordingly, U1 can also control power switch 262 based on any voltage associated with transformer 252, sometimes referred to as voltage-mode control. In some embodiments, transformer 252 does not include the fourth winding 260, and U1 instead controls power switch 262 based solely on primary-side feedback (e.g., feedback based on circuitry electrically coupled to the primary winding 254). Primary-side feedback allows for complete electrical isolation between the input and output portions of the first flyback converter 250.

In one embodiment, U1 and U2 are configured to produce either a CV output or a CC output based on the load associated with an output. For example, if the load associated with an output is resistive, a CV output is produced. Alternatively, if the load associated with an output comprises a current sink (e.g., a load comprising a series arrangement of LEDs), a CC output is produced.

In one embodiment, the second flyback converter 270 comprises a 3-winding isolating transformer 272 having a primary winding 274, a secondary winding 276, and a tertiary winding 280. U2 can be a power supply package that is substantially similar or identical to U1. U2 can also be coupled to the primary winding 274 and the tertiary winding 280 of transformer 272 in a manner substantially similar or identical to the manner in which U1 is coupled to the primary winding 254 and fourth winding 260 of transformer 252. Secondary winding 276 is coupled to a blocking diode and a filter/storage capacitor in order to produce a CC output 284. The CC output 284 can be used to power any load suitable for a constant current supply such as, for example, one or more LEDs arranged in series.

Because U1 and U2 each comprise separate and independent internal control circuitry and separate and independent feedback terminals (e.g., both have ISENSE and VSENSE terminals), one embodiment of the dual output power supply 200 allows for fully-independent control of the first flyback converter 250 and the second flyback converter 270. Fully-independent control of the CV outputs 264, 266 and the CC output 284 is therefore possible. Also, the dual output power supply 200 can be built with a profile at least as thin as 10 mm. In one embodiment, U1 and U2 comprise the iW7005 power supply control package from iWatt, Inc.

FIG. 3 is a table that compares (i) a one-transformer design for a dual output power supply with (ii) a two-transformer design for a dual output power supply (e.g., the dual output power supply 200 of FIG. 2. A one-transformer design would require that at least one of the outputs, either the CV output or the CC output, be implemented using a non-flyback converter topology. FIG. 3 makes clear that the two-transformer design can have many advantages over the one-transformer design.

Package-Level Integration

Although FIG. 2 depicts embodiments of a dual output power supply 200 that comprise two separate power supply control packages (U1, U2) integrated into a single a PCB to form a single power supply 200 capable of producing separate and independently-controllable CV and CC outputs, other embodiments are possible in which a dual output power supply of equivalent functionality is implemented using a single power supply control package. Furthermore, a single power supply control package capable of controlling multiple power switches to produce separate and independently-controllable CV and CC outputs can comprise various numbers of terminals for external connections. For example, the power switches controlled by such a power supply control package can be either external or internal to the power supply control package, with more internal power switches resulting in fewer terminals for the package. Similarly, the particular switching technique (e.g., PWM, PFM, or pulse train control) and feedback signals (e.g., voltage or current based feedback techniques) used by the package to control various power switches can influence the number of terminals provided by a particular embodiment.

Figure 4A:
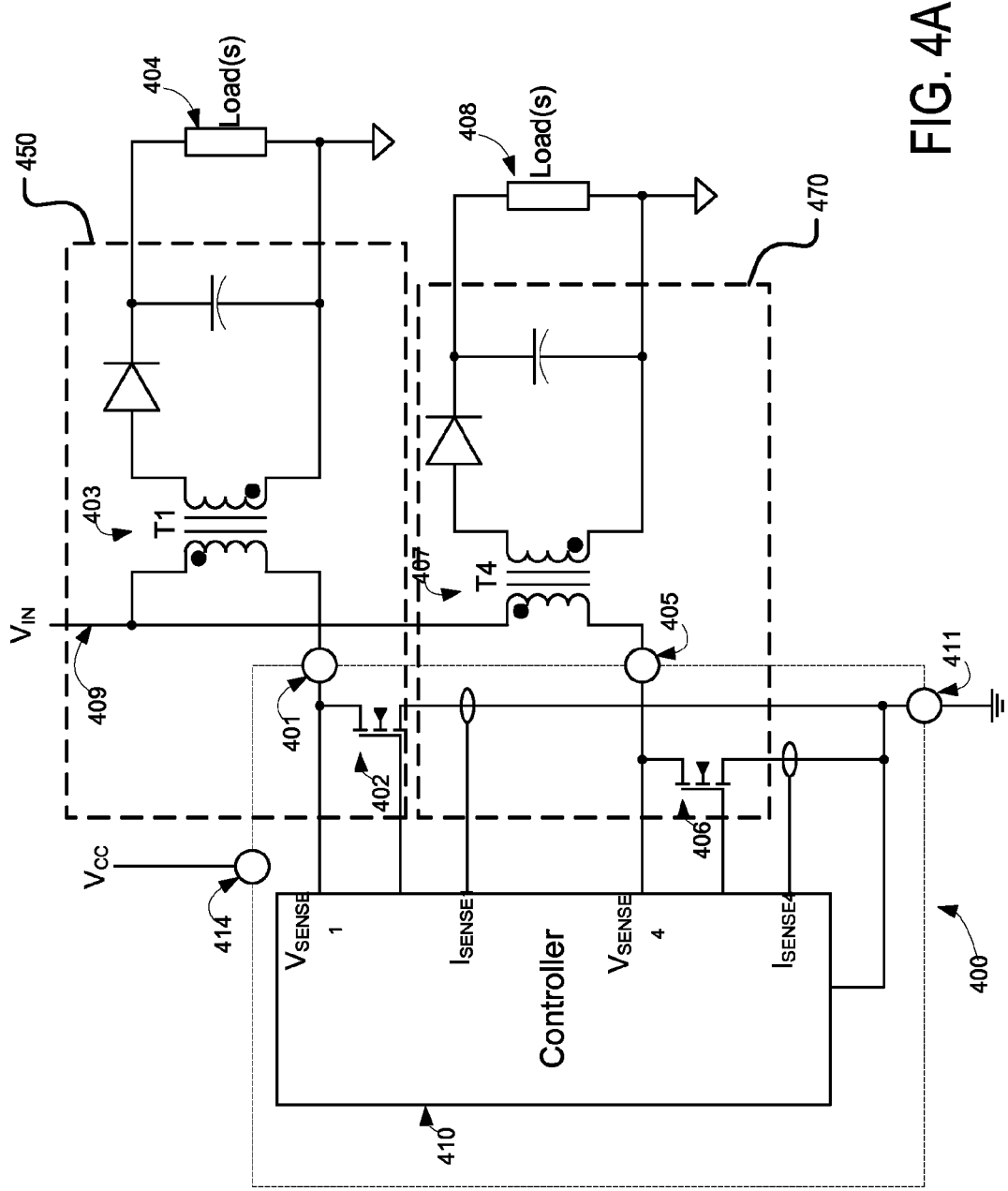
FIG. 4A is a block diagram of one embodiment of a four-terminal power supply control package.

For example, FIG. 4A is a block diagram of one embodiment of a four-terminal power supply control package 400 for controlling two switched transformer-coupled power converters 450, 470. A first terminal 401 is provided for coupling a drain terminal of a first internal power switch 402 to a first isolating transformer 403, which is coupled to a rectified DC source (Vin) 409, comprising the first power converter 450. The first power converter 450 is coupled to load(s) 404. A second terminal 405 is provided for coupling a drain terminal of a second internal power switch 406 to a second isolating transformer 407, which is coupled to a rectified DC source (Vin) 409, comprising the second power converter 470. The second power converter 470 is coupled to load(s) 408. Controller 410 is included in the package 400 and determines the ON and OFF state of internal power switch 402 and internal power switch 406, providing a regulated output source to load(s) 404 and load(s) 408. As can be seen in FIG. 4A, the package 400 is configured to sense voltage and/or current signals associated with the primary windings of the isolating transformers 403, 407. Package 400 is therefore capable of implementing primary-side feedback control of power switches 404, 406 without compromising the isolation provided by the transformers 403, 407. A third ("ground") terminal 411 is provided for coupling a source terminal of the internal power switches to a primary side ground reference. A fourth ("bias power") terminal 414 is provided for receiving a bias supply voltage (Vin) to operate the power supply control package 400.

The first power converter 450 and the second power converter 470 can both be flyback converters, can both be some other switching power converter topologies, or can comprise two distinct converter topologies. In one embodiment, the first power converter 450 is a flyback converter that is configured to provide a CV output to the load(s) 404, and the second power converter 470 is a flyback converter that is configured to provide a CC output to the load(s) 408.

Figure 4B:
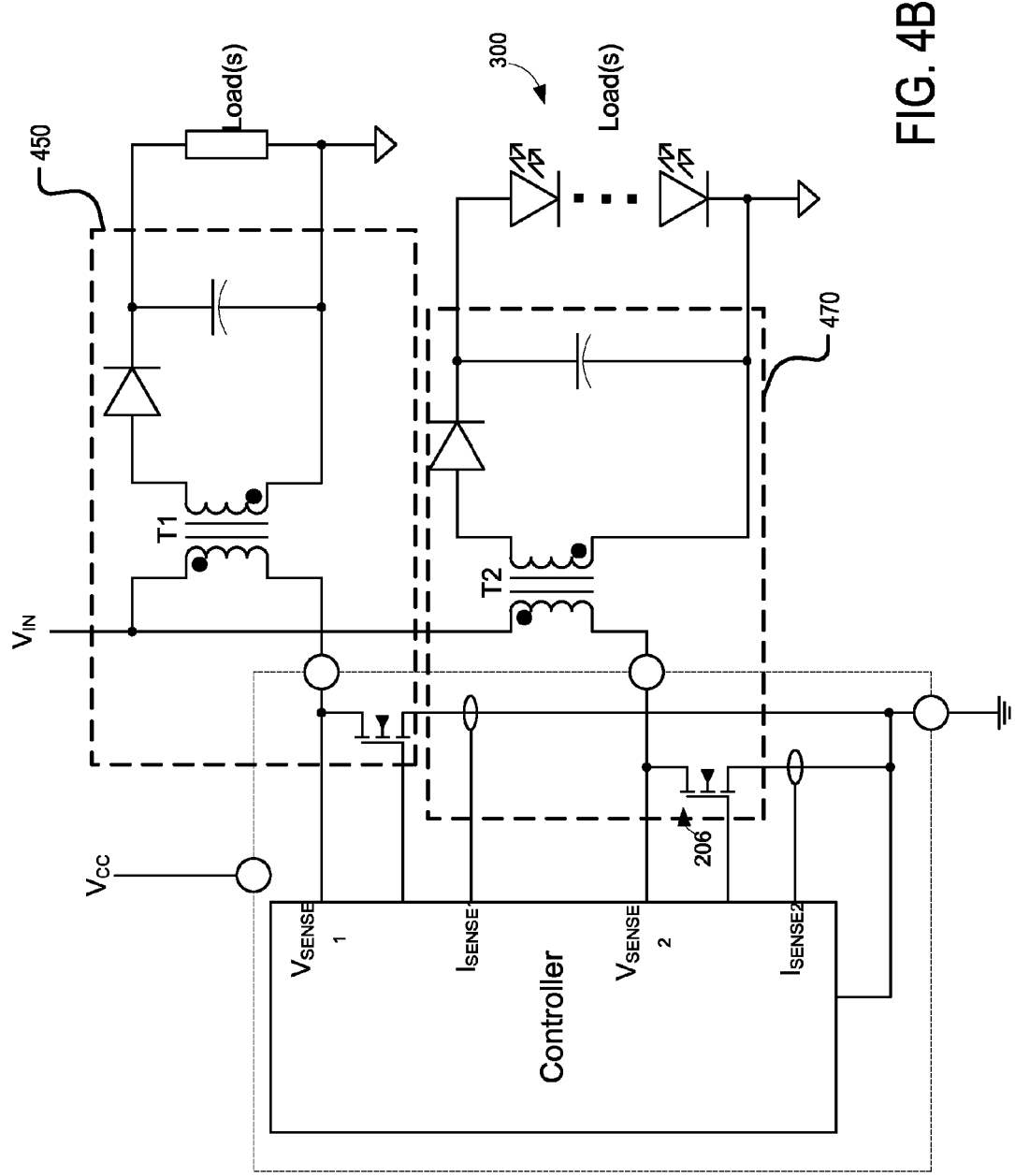
FIG. 4B is a block diagram of another embodiment of a four-terminal power supply control package.

FIG. 4B is a another depiction of one embodiment of a four-terminal power supply control package 400 for controlling two switched transformer-coupled power converters 450, 470. Controller 410 determines the ON and OFF state of internal power switch 406 such that the second power converter 470 provides a regulated current source (i.e., CC output) to load 300. As mentioned above, a regulated current source is desired to control specific types of loads 300 such as one or more LED devices arranged in series.

Figure 5:
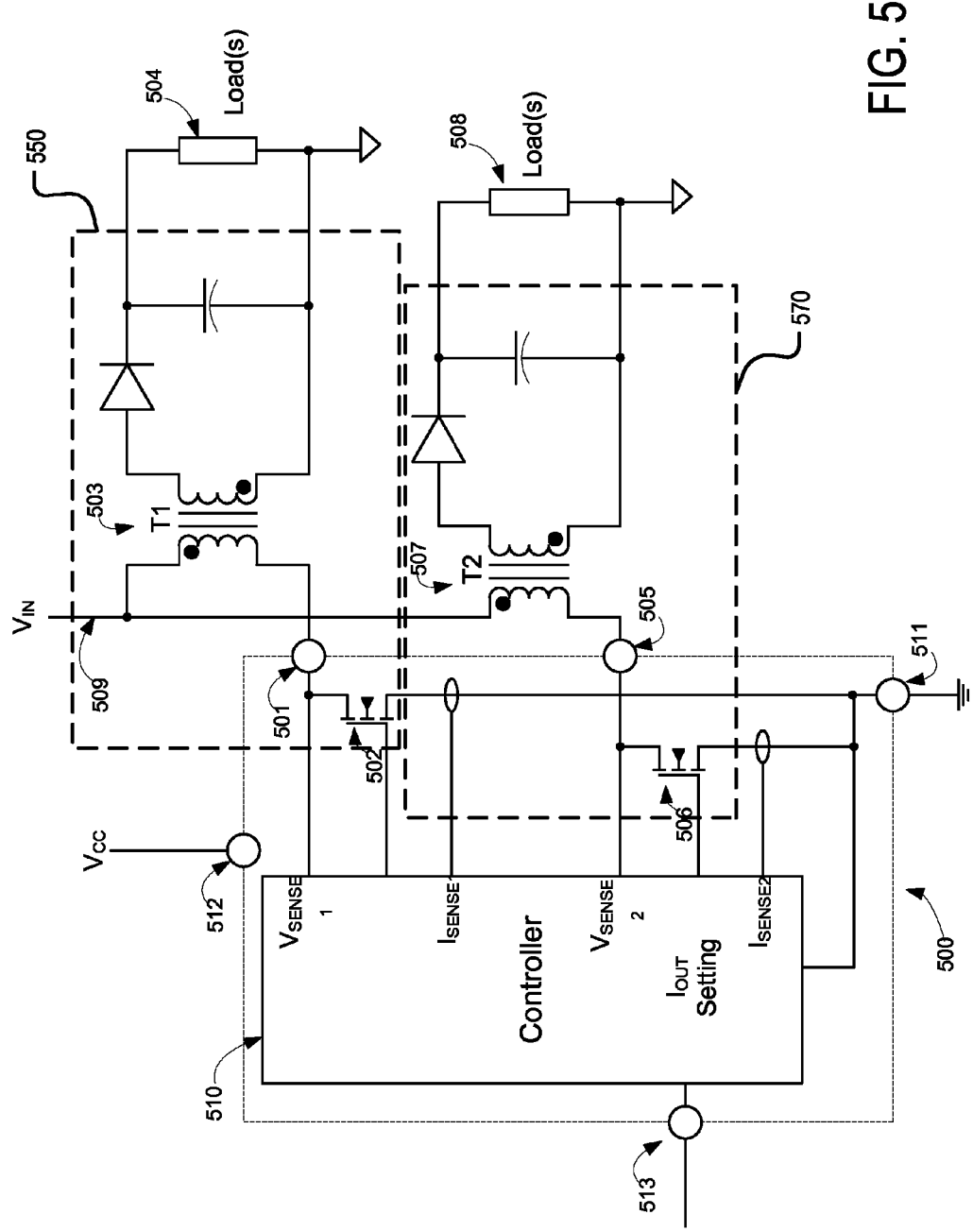
FIG. 5 is a block diagram of one embodiment of a five-terminal power supply control package.

FIG. 5 illustrates one embodiment of a five-terminal power supply control package 500 for controlling two switched transformer-coupled power converters 550, 570. A first terminal 501 is provided for coupling a drain terminal of a first internal power switch 502 to a first isolating transformer 503, which is coupled to a rectified DC source (Vin) 509, comprising the first power converter 550. The first power converter 550 is coupled to load(s) 504. A second terminal 505 is provided for coupling a drain terminal of a second internal power switch 506 to a second isolating transformer 507, which is coupled to a rectified DC source (Vin) 509, comprising the second power converter 570. The second power converter 570 is coupled to load(s) 508. Controller 510 is included in package 500 and determines the ON and OFF state of internal power switch 502 and internal power switch 506, providing regulated output source to load(s) 504 and load(s) 508. Controller 510 determines the ON and OFF state of internal power switch 506 such that the second power converter provides a regulated current source to load 508. A third ("ground") terminal 511 is provided for coupling a source terminal of the internal power switches to a primary side ground reference. A fourth ("bias power") terminal 512 is provided for receiving a bias supply voltage (Vin) to operate the power supply control package 500. A fifth terminal 513 is provided for coupling an input signal which sets desired output current output of the second power converter 570. As the load 508 can be LED elements, the output current setting input can determine the light output level of the LED elements.

Figure 6A:
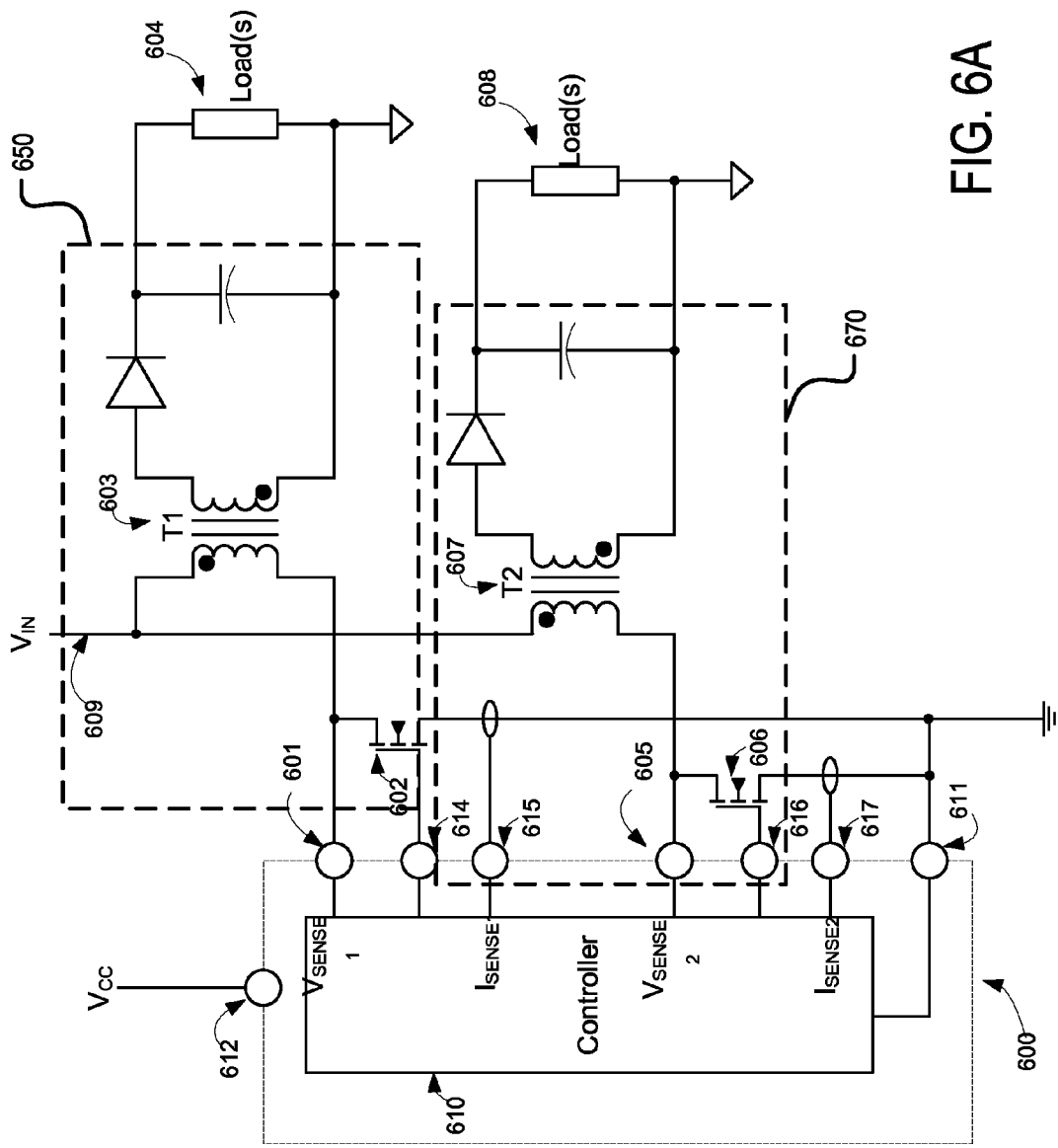
FIG. 6A is a block diagram of one embodiment of an eight-terminal power supply control package.

FIG. 6A illustrates one embodiment of an eight-terminal power supply control package 600 for controlling two switched transformer-coupled power converters 650, 670. A first terminal 601 is provided for coupling a first isolating transformer 603 which is coupled to a rectified DC source (Vin) 609, a second terminal 614 is provided for coupling a gate terminal of a first external power switch 602, a third terminal 615 senses the primary current waveform of the first power converter 650, thus comprising the first power converter 650. The first power converter 650 is coupled to load(s) 604. A fourth terminal 605 is provided for coupling a second isolating transformer 607, which is coupled to a rectified DC source (Vin) 609, a fifth terminal 616 is provided for coupling to a gate terminal of a second external power switch 606, a sixth terminal 617 senses the primary current waveform of the second power converter 670, thus comprising the second power converter 670. The second power converter 670 is coupled to load(s) 608. Controller 610 determines the ON and OFF state of external power switch 602 and external power switch 606, providing regulated output source to load(s) 604 and load(s) 608. A seventh ("ground") terminal 611 is provided for coupling a source terminal of the external power switches to a primary side ground reference. An eighth ("bias power") terminal 612 is provided for receiving a bias supply voltage (Vin) to operate the power supply control package 600.

Figure 6B:
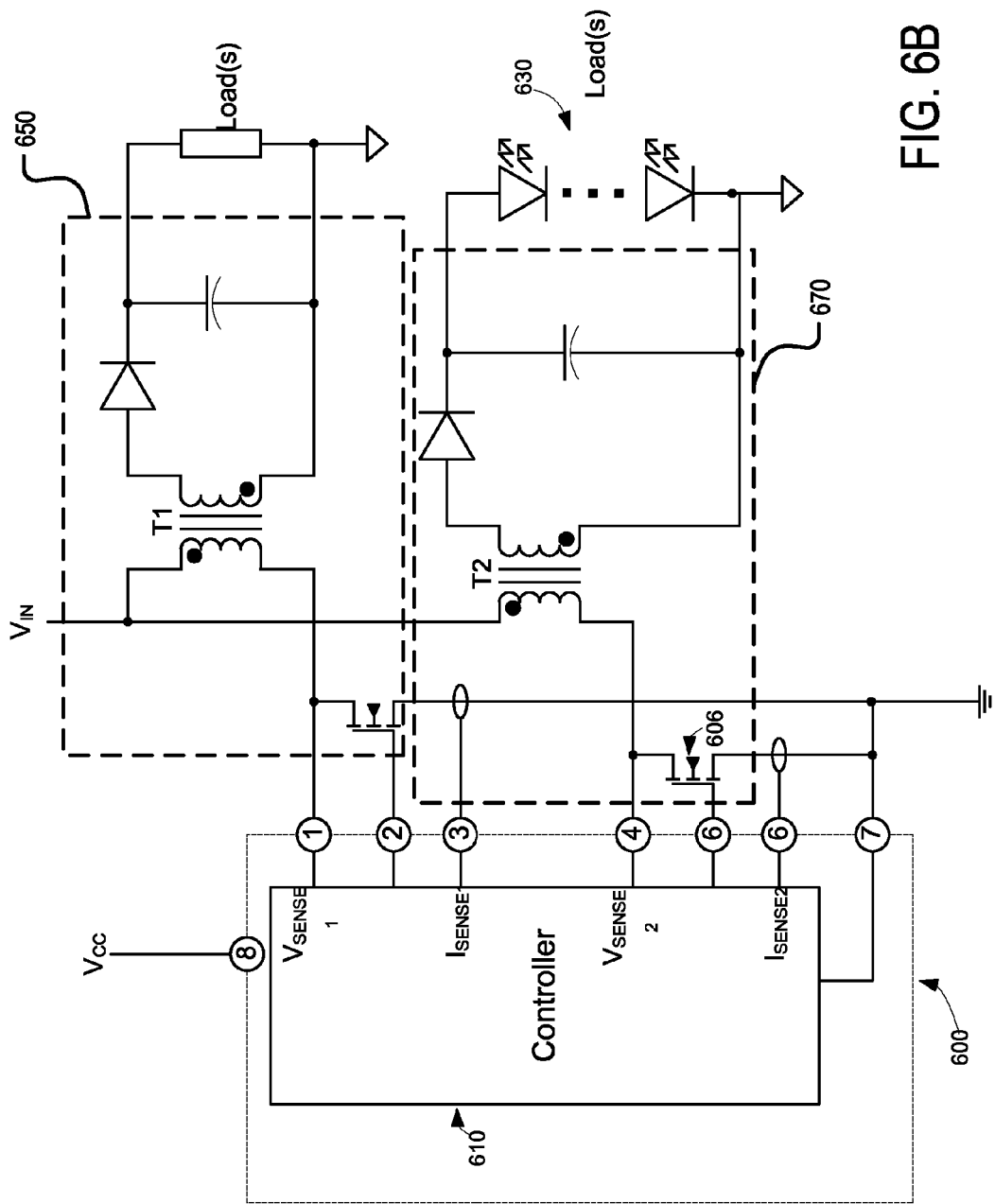
FIG. 6B is a block diagram of another embodiment of an eight-terminal power supply control package.

FIG. 6B is a another depiction of one embodiment of an eight-terminal power supply control package 600 for controlling two switched transformer-coupled power converters 650, 670. Controller 610 determines the ON and OFF state of internal power switch 606 such that the second power converter provides a regulated current source (i.e., CC supply output) to load 630. As mentioned above, a regulated current source is desired to control specific types of loads 630 such as one or more LED devices arranged in series.

Figure 7:
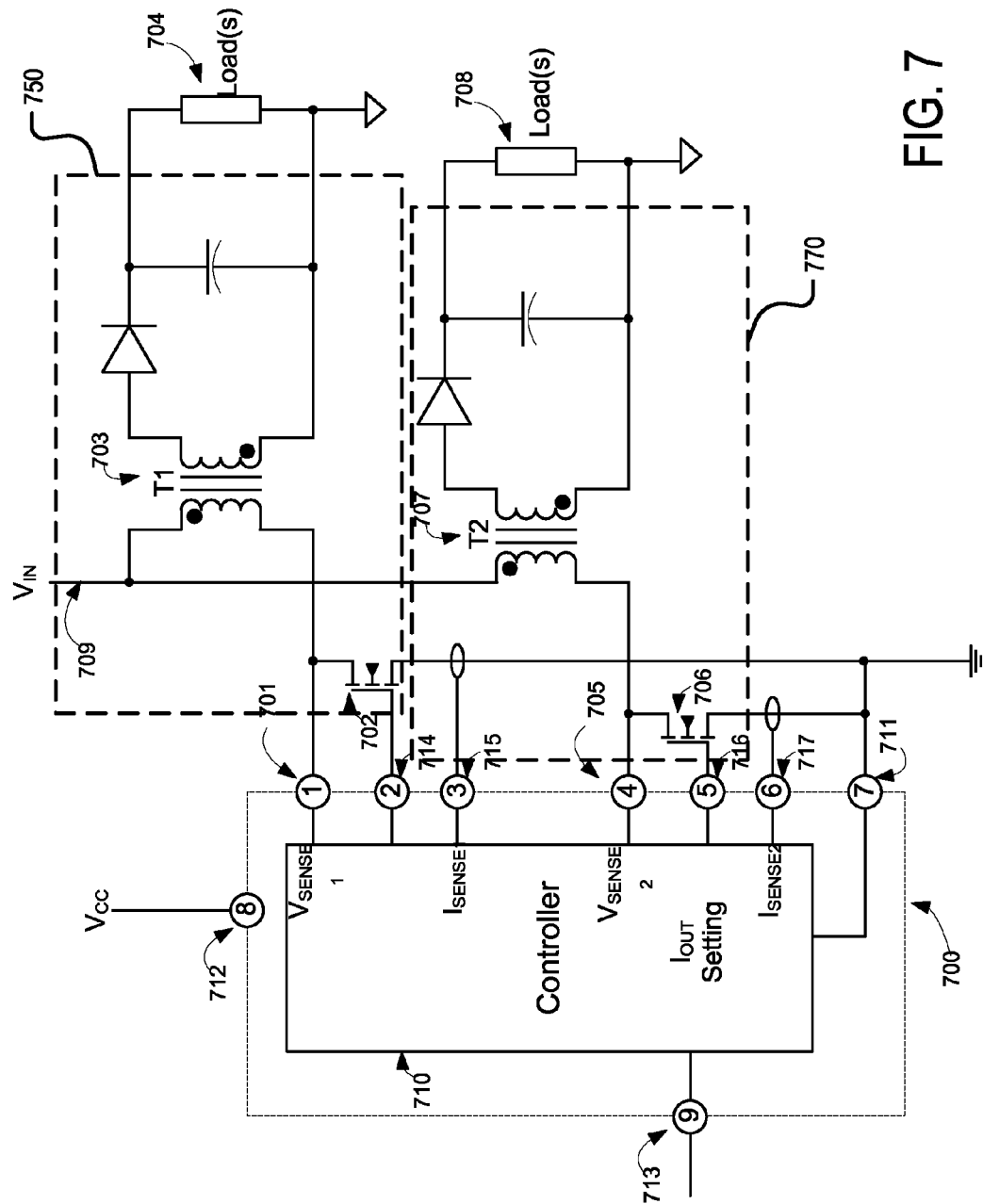
FIG. 7 is a block diagram of one embodiment of a nine-terminal power supply control package.

FIG. 7 illustrates one embodiment of a nine-terminal power supply control package 700 for controlling two switched transformer-coupled power converters 750, 770. A first terminal 701 is provided for coupling a first isolating transformer 703 which is coupled to a rectified DC source (Vin) 709, a second terminal 714 is provided for coupling a gate terminal of a first external power switch 702, a third terminal 715 is provided for sensing the primary current waveform of the first power converter 750, thus comprising the first power converter 750. The first power converter 750 is coupled to load(s) 704. A fourth terminal 705 is provided for coupling a second isolating transformer 707, which is coupled to a rectified DC source (Vin) 709, a fifth terminal 716 for coupling to a gate terminal of a second external power switch 706, a sixth terminal 717 senses the primary current waveform of the second power converter 770, thus comprising the second power converter 770. The second power converter 770 is coupled to load(s) 708. Controller 710 determines the ON and OFF state of external power switch 702 and external power switch 706, providing regulated output source to load(s) 704 and load(s) 708. In one embodiment, controller 710 determines the ON and OFF state of external power switch 706 such that the second power converter provides a regulated current source (e.g., CC supply) to load 708. A seventh ("ground") terminal 711 is provided for coupling a source terminal of the internal power switches to a primary side ground reference. An eighth ("bias power") terminal 712 is provided for receiving a bias supply voltage (Vin) to operate the power supply control package 700. An ninth terminal 713 is provided for coupling an input signal which sets desired output current output of the second power converter. As the load 708 can be LED elements, the output current setting input will determine the light output level of the LED elements.

Although the invention has been described in terms of the presently preferred embodiments, it will be understood by those skilled in the art that many other embodiments and variations of the invention are possible after having read the disclosure. According, the invention is not to be limited except in accordance with the appended claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative designs for a system for providing open air noise cancellation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A power supply circuit, comprising:
a first power converter configured to produce a constant voltage output based on an input signal, the first power converter comprises a first switch and a first switch control circuit, wherein the first switch control circuit controls the first power converter in response to a first error signal for driving the first switch; and
a second power converter configured to produce a constant current output based on the input signal, the second power converter comprises a second switch and a second switch control circuit, wherein the second switch control circuit controls the second power converter in response to a second error signal for driving the second switch, the second switch control circuit operated independent from the first switch control circuit.

2. The power supply circuit of claim 1, wherein the first switch control circuit and the second switch control circuit are included in a single integrated circuit.

3. The power supply circuit of claim 1, wherein the first switch control circuit and the second switch control circuit are implemented on a single monolithic semiconductor die.

4. The power supply circuit of claim 1, wherein the first power converter and the second power converter are based on a flyback topology.

5. The power supply circuit of claim 1, wherein the first power converter and the second power converter employ a switch control method based on primary-side feedback.

6. The power supply circuit of claim 1, wherein the power supply circuit is included in the case of a television monitor.

7. A power supply package for controlling delivery of power from a source to a plurality of loads, comprising:
a first terminal for coupling to a primary winding of a first transformer;
a second terminal for coupling to a primary winding of a second transformer;
a third terminal for coupling to a ground reference;
a fourth terminal for coupling to a source of operating power;
a first power switch having an input coupled to the first terminal, an output coupled to the third terminal, and an activation gate;
a second power switch having an input coupled to the second terminal, an output coupled to the third terminal, and an activation gate;
a first control circuitry coupled to the first power switch activation gate and responsive to an error signal for driving the first power switch, the error signal derived from an internally generated compensation signal; and
a second control circuitry coupled to the second power switch activation gate and responsive to an error signal for driving the second power switch, the error signal derived from an internally generated compensation signal, wherein the second control circuitry is operated independent from the first control circuitry.

8. The power supply package of claim 7, wherein the control circuitry coupled to the first power switch and the second power switch are based on a flyback topology.

9. The power supply package of claim 7, wherein the power supply package is included in the case of a television monitor.

* * * * *

UNITED STATES PATENT AND TRADEMARK OFFICE
CERTIFICATE OF CORRECTION

| | | |
|---|---|---|
| PATENT NO. | : 8,933,582 B2 | Page 1 of 1 |
| APPLICATION NO. | : 13/181330 | |
| DATED | : January 13, 2015 | |
| INVENTOR(S) | : Junjie Zheng et al. | |

It is certified that error appears in the above-identified patent and that said Letters Patent is hereby corrected as shown below:

Title Page, item (57), Abstract:
Line 9, replace "Any switching power converters included the in the single power supply....," with
-- Any switching power converters included in the single power supply... --.

Signed and Sealed this
Twenty-ninth Day of March, 2016

Michelle K. Lee
*Director of the United States Patent and Trademark Office*